(12) United States Patent
Aichholzer et al.

(10) Patent No.: US 6,246,300 B1
(45) Date of Patent: Jun. 12, 2001

(54) PASSIVE NETWORK IN THE FORM OF A CCRL ARRAY

(75) Inventors: Klaus-Dieter Aichholzer, Deutschlandsberg; Gerald Kainz, Granz, both of (AT)

(73) Assignee: Siemens Matsushita Components GmbH & Co. KG, München (DE)

( * ) Notice: Subject to any disclaimer, the term of this patent is extended or adjusted under 35 U.S.C. 154(b) by 0 days.

(21) Appl. No.: 09/269,428

(22) PCT Filed: Sep. 25, 1997

(86) PCT No.: PCT/DE97/02184

§ 371 Date: Mar. 26, 1999

§ 102(e) Date: Mar. 26, 1999

(87) PCT Pub. No.: WO98/13841

PCT Pub. Date: Apr. 2, 1998

(30) Foreign Application Priority Data

Sep. 27, 1996 (DE) .............................. 196 39 947

(51) Int. Cl.$^7$ .................................................. H03H 7/06
(52) U.S. Cl. ............................................ 333/172; 333/185
(58) Field of Search .................................. 333/172, 181, 333/185, 12

(56) References Cited

U.S. PATENT DOCUMENTS

| | | | |
|---|---|---|---|
| 4,935,710 | * 6/1990 | Yamazaki et al. | 333/12 X |
| 5,307,309 | * 4/1994 | Protigal et al. | 257/532 X |
| 5,382,925 | 1/1995 | Hayashi et al. | 333/112 |
| 5,388,024 | 2/1995 | Galvagni | 361/309 |
| 5,495,387 | * 2/1996 | Mandai et al. | 333/172 X |
| 5,590,016 | 12/1996 | Fujishiro et al. | 361/313 |

FOREIGN PATENT DOCUMENTS

| | | |
|---|---|---|
| 40 08 507 A1 | 9/1990 | (DE) . |
| 41 18 771 A1 | 1/1992 | (DE) . |
| 44 10 753 A1 | 10/1994 | (DE) . |
| 0 423 821 A2 | 4/1991 | (EP) . |
| 0 433 176 A2 | 6/1991 | (EP) . |
| 2 249 746 | 5/1992 | (GB) . |
| 6-283384 | * 7/1994 | (JP) . |

OTHER PUBLICATIONS

Patent Abstracts of Japan—06283384—Oct. 7, 1994.
Patent Abstracts of Japan—06283385—Oct. 7, 1994.
Patent Abstracts of Japan—08124800—May 17, 1996.

* cited by examiner

*Primary Examiner*—Justin P. Bettendorf
(74) *Attorney, Agent, or Firm*—Schiff Hardin & Waite

(57) ABSTRACT

In a passive network, such as a CC array in the form of a chip, internal conductors of a number of capacitors are led out at a longitudinal side surface of a chip wafer as terminals therefor. Common frame electrodes of the number of capacitors are, in contrast, led out at both frontal side surfaces of the chip wafer.

5 Claims, 5 Drawing Sheets

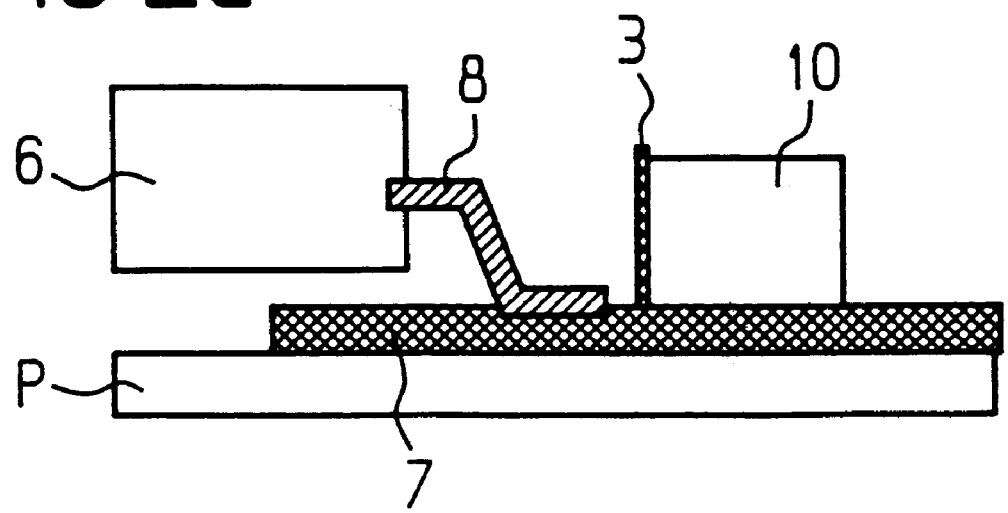
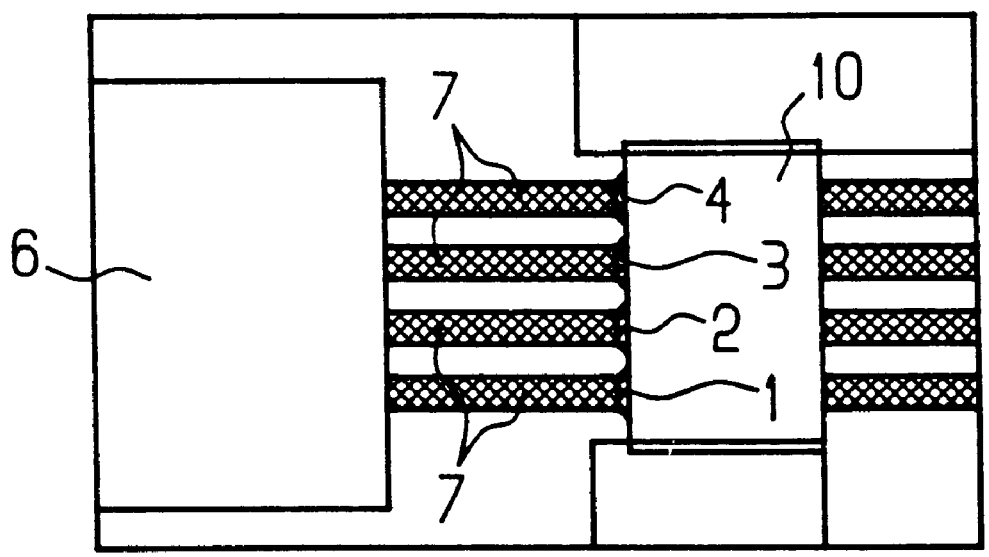

PASSIVE NETWORK IN THE FORM OF A CCRL ARRAY

BACKGROUND OF THE INVENTION

Field of the Invention

The present invention relates to a passive network in the form of a chip and, more specifically, to a passive network, such as a CC (Chip-Capacitor) array in the form of a chip, wherein internal conductors of a number of capacitors are lead out at a longitudinal side surface of a chip wafer as terminals and frame electrodes of the capacitors are led out at both frontal side surfaces of the chip wafer.

SUMMARY OF THE INVENTION

According to the present invention, for the creation of CC (Chip Capacitor) arrays, internal conductors of a number of capacitors on one longitudinal side surface of a chip wafer are led out as terminals, while common frame electrodes of the number of capacitors are led out at both side surfaces of the chip wafer.

A CC array constructed according to the present invention can, for example find application for interference suppression at terminal lines of microcontrollers. preferably, in a PLCC (Plastic Leaded Chip Carrier) housing, or in connection with integrated circuits (IC's), hybrid components, and others.

A particular advantage in this construction of a CC array according to the present invention is that terminals which conduct voltage, called "hot" terminals of the individual capacitors, are routed very close to the integrated circuit (IC) and the associated terminals lines can be further routed under the CC array. The routing of the voltage-carrying terminals very close to the integrated circuit satisfies a requirement of experts in the EMI (Electro-Magnetic Interference), field which states that the closer a capacitor is located to the terminals of the integrated circuit, the smaller the required capacitance value can be. For the user, this yields further advantages with respect to a considerable savings of space in relation to individual capacitors, as well as a lower equipping expense.

According to an embodiment of the present invention, corresponding to the provided module design for CCR (Chip-Capacitor-Resistor) arrays, resistance regions additionally need be applied on a surface of a chip wafer only in a number corresponding to the number of capacitors. Terminals of the individual resistance regions are on the one hand, respectively connected with the internal conductor of an allocated capacitor and, on the other hand are led out at the second longitudinal side surface of the chip wafer. Analogous to the above-described embodiment of a CC array according to the present invention, a passive network expanded to form a CCR array also can be used for the suppression of interference on lines. An additional advantage of this embodiment is the higher effectiveness of the RC element or elements created.

In the provided module system, according to the present invention a passive network for CCRL arrays can be created (Chip-Capacitor-Resistor-Inductance) wherein a ferrite wafer is applied on the surface of the above-described resistance layer regions.

By means of this expansion of a passive network in the form of a CCRL array, there results an additional advantage; namely, the higher effectiveness of the CCRL array due to the addition of an inductance L to the RC elements.

In order to achieve a suppression of interference in the RF range, conductors are typically plugged through small ferrite tubes. The effectiveness of open magnetic circuits in which an interconnect is located parallel to the ferrite surface is thus somewhat smaller. For this reason, in the inventive design of a CCRL array the effectiveness of the open magnetic circuits comes into play only in the higher frequency range, i.e., in a frequency range above 100 MHz.

An electrical component in chip form is particularly advantageous when constructed with the depicted passive network, wherein interconnects are arranged on a board, and are connected with a CC array or with a CCR array, and wherein a microcontroller is connected with the interconnects via terminals.

In an arrangement with a CC array, the interconnects are guided through under the CC array. Conversely in an arrangement with a CCR array the interconnects are not led through under the CCR array.

Additional features and advantages of the present invention are described in, and will be apparent from, the Detailed Description of the Preferred Embodiments and the Drawing.

DESCRIPTION OF THE DRAWINGS

FIG. 2a shows a section of the design of an arrangement of a CC array on a board;

FIG. 2b shows a top view of the design arrangement of FIG. 2a;

FIG. 4b shows a top view of the design arrangement of FIG. 4a;

DETAILED DESCRIPTION OF THE PREFERRED EMBODIMENTS

Figure 1A:
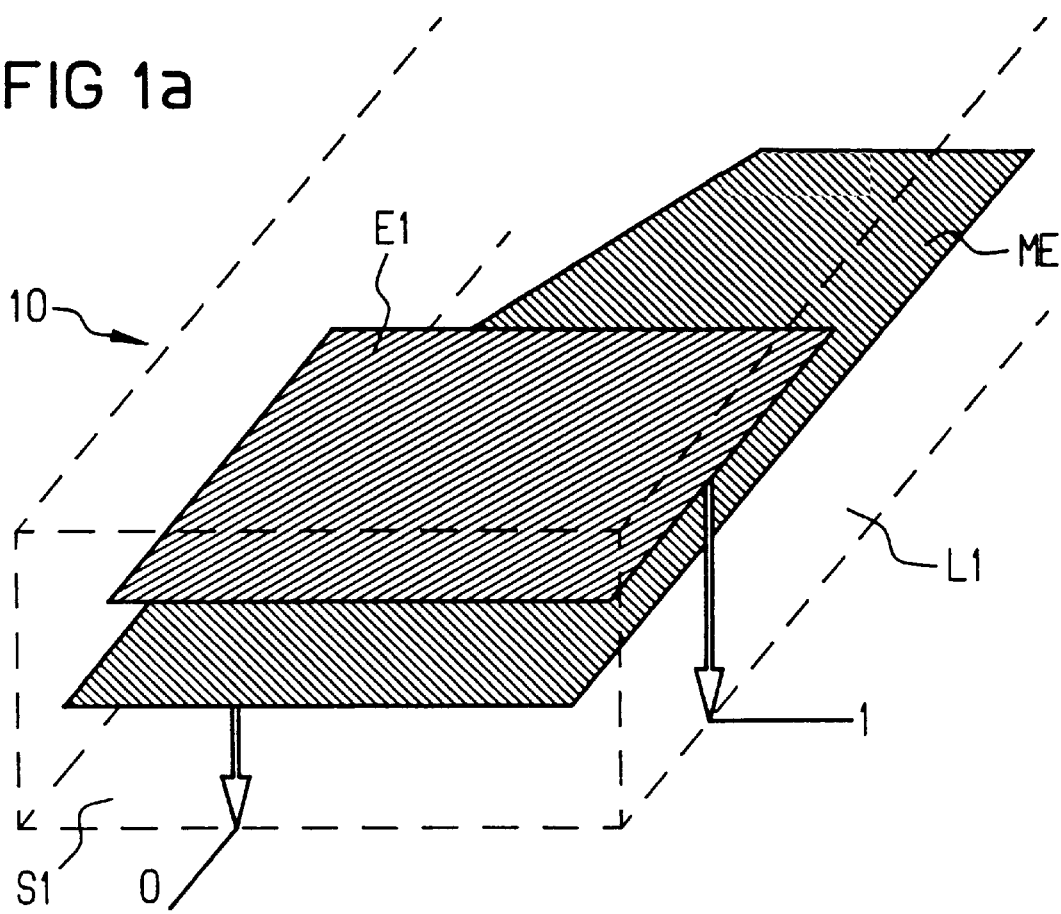
FIG. 1a schematically shows an enlarged perspective view of a part of a passive network of the present invention as a CC array.
Figure 1B:
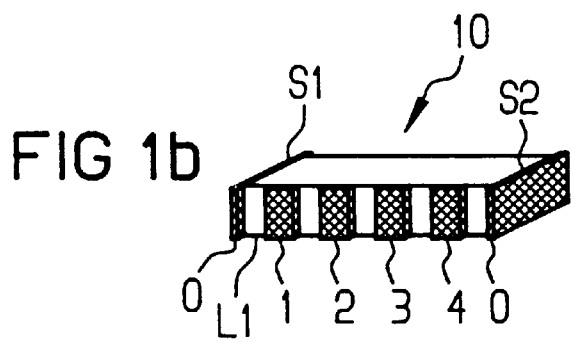
FIG. 1b schematically shows an enlarged perspective view of a CC array of the present invention in the form of a chip.
Figure 1C:
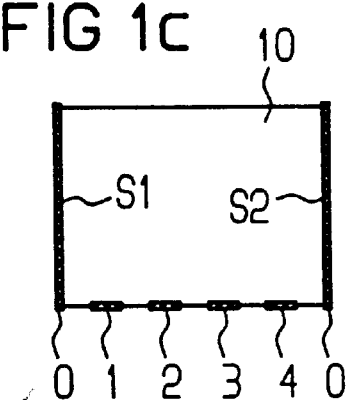
FIG. 1c shows a sectional view of the CC array of FIG. 1b.

FIG. 1a schematically shows an enlarged perspective view of a part of a passive network in the form of a CC array 10. In FIG. 1a, a common frame electrode ME is formed on a frontal side surface S1 as an electrode 0 which, as can be seen in FIGS. 1b and 1c, completely covers the frontal side surface S1. In addition, an electrode E1 of, for example, a first capacitor C1 is shown from which a line indicated by an arrow leads to an external terminal 1 without contacting the frame electrode ME in the one longitudinal side surface L1 of the CC array chip.

Figure 1D:
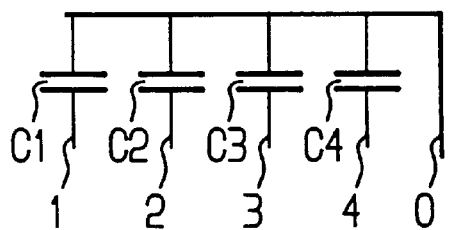
FIG. 1d shows an equivalent circuit diagram of the CC array of FIGS. 1b and 1c.

FIG. 1b is a schematic enlarged perspective view of a chip 10 in the form of a CC array, while FIG. 1c is a sectional view of the CC array 10. In FIGS. 1b and 1c, a frame electrode 0 is respectively provided at both frontal side surfaces S1 and S2. In addition, in FIG. 1c the terminals 1 to 4 provided on the one longitudinal side surface L1 can be seen. FIG. 1d is merely an equivalent circuit diagram of a CC array with four capacitors C1 to C4, the terminals 1 to 4, and the frame terminal 0.

In FIGS. 2a and 2b, the design of an arrangement of various components is shown in a section and, respectively, a top view. Interconnects 7 are provided on a board P from which terminals 8 lead, for example, to a microcontroller 6. As can be seen in the sectional view in FIG. 2a, the interconnects 7 are led through under the chip 10 with the CC array. In the sectional view of FIG. 2a a terminal 3 can be seen and, in the top view of FIG. 2b the terminals 1 to 4 can be seen.

Figure 3A:
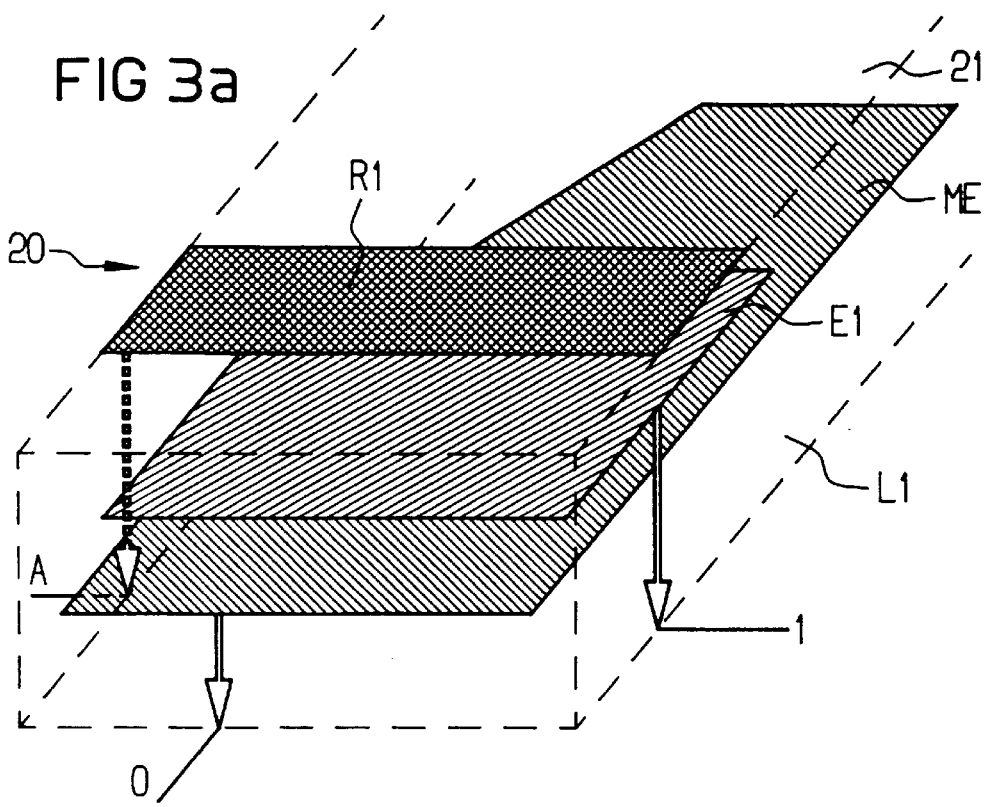
FIG. 3a schematically shows an enlarged perspective view of a part of a network according to the present invention as a CCR array.

FIG. 3a is an enlarged perspective view corresponding to FIG. 1a, of a part of a passive network in the form of a CCR array which, thus, represents a development of the CC array shown in FIG. 1a. In development of the embodiment shown in FIG. 1a, in FIG. 3a a resistance layer, for example corresponding to a resistor R1, is applied on a surface 21 of a chip 20.

As indicated in the schematic view of FIG. 3a, one end of the resistance layer R1 is connected with the terminal 1 formed in the longitudinal side surface L1, while the other end of the resistance layer R1, as indicated by a broken arrow, is connected with a terminal A formed on the other longitudinal side surface L2.

Figure 3B:
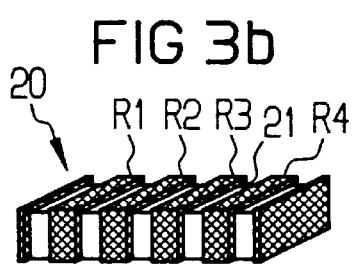
FIG. 3b schematically shows an enlarged perspective view of a CCR array of the present invention in the form of a chip.
Figure 3D:
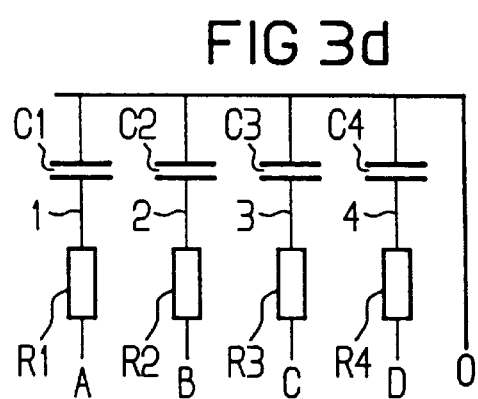
FIG. 3d shows an equivalent circuit diagram of a CCR array of FIGS. 3b and 3c.
Figure 3C:
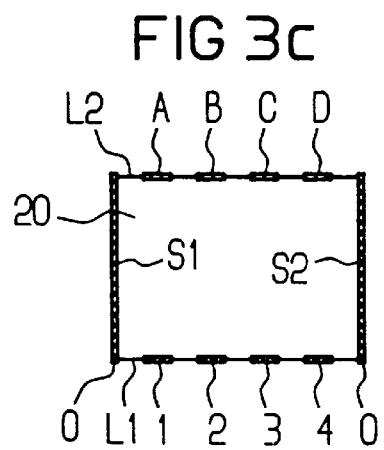
FIG. 3c shows a sectional view of the CCR array of FIG. 3b.
Figure 3E:
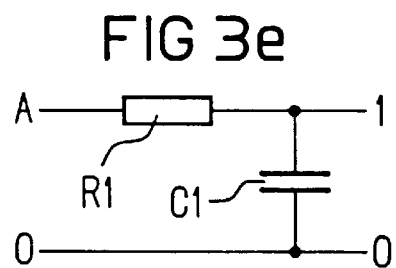
FIG. 3e shows an equivalent circuit diagram of an RC element.

The representations in FIGS. 3b and 3c correspond to the representations in FIGS. 1b and 1c, with the difference being that in FIG. 3b four resistance regions R1 to R4 are additionally provided on the upper side 21 of the chip wafer 20. Such regions, as can be seen in the sectional view of FIG. 3c, are connected with terminals A to D provided on the second longitudinal side surface L2.

The equivalent circuit diagram in FIG. 3d is an expansion of the equivalent circuit diagram in FIG. 1d because resistors R1 to R4, corresponding to the four resistance layer regions (R1 to R4) are connected in series to the four capacitors C1 to C4. Resistors R1 to R4 are connected on the one hand with the terminals 1 to 4 provided on the one longitudinal side surface L1, and on the other hand with the terminals A to D provided on the opposite-lying longitudinal side surface L2. FIG. 3d is merely an equivalent circuit diagram of an RC element formed from the capacitor C1 and the resistor R1.

Figure 4A:
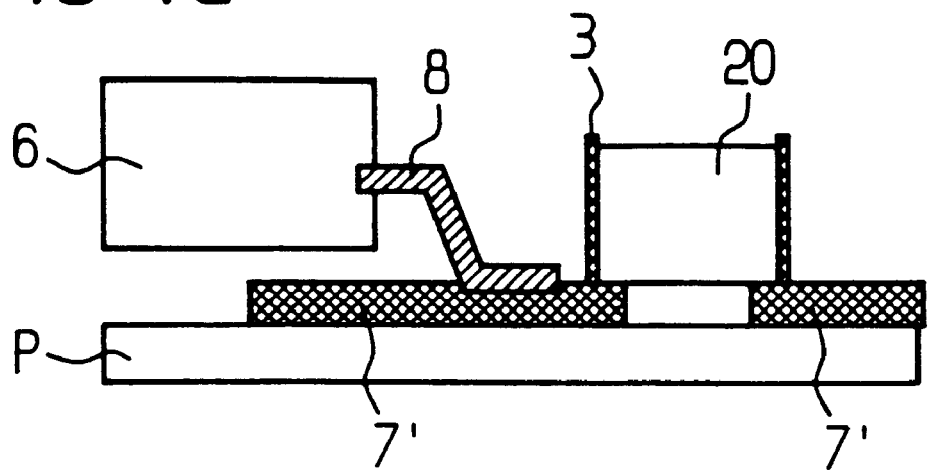
FIG. 4a shows a sectional view of the design of an arrangement of a CCR array on a board.
Figure 4B:
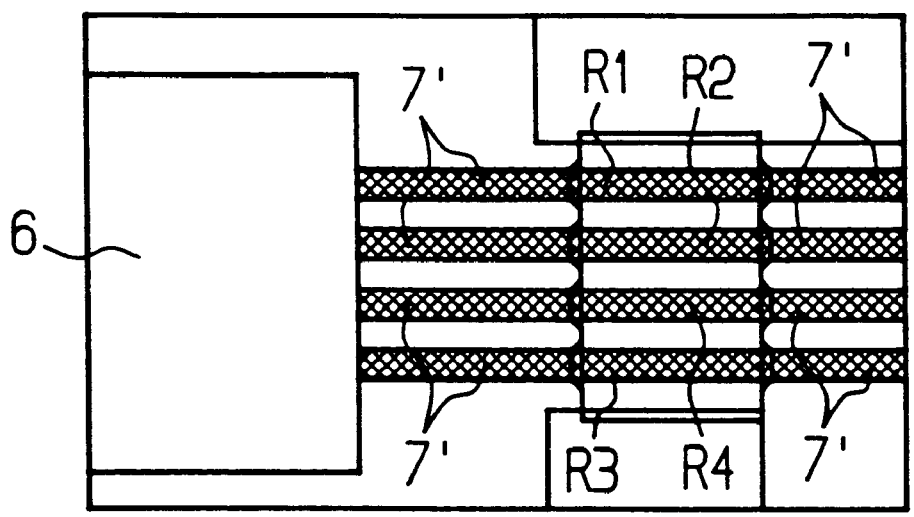

The sectional view in FIG. 4a and the top view in FIG. 4b essentially correspond to the representations in FIGS. 2a and 2b, with the difference being that instead of the CC array 10 in FIGS. 2a and 2b, a CCR array 20 with a resistance layer R is now arranged on the board P. A further difference between the representations in FIGS. 4a and 4b with respect to the representations in FIGS. 2a and 2b is that interconnects 7' are not led through under the CCR array 20.

Figure 5A:
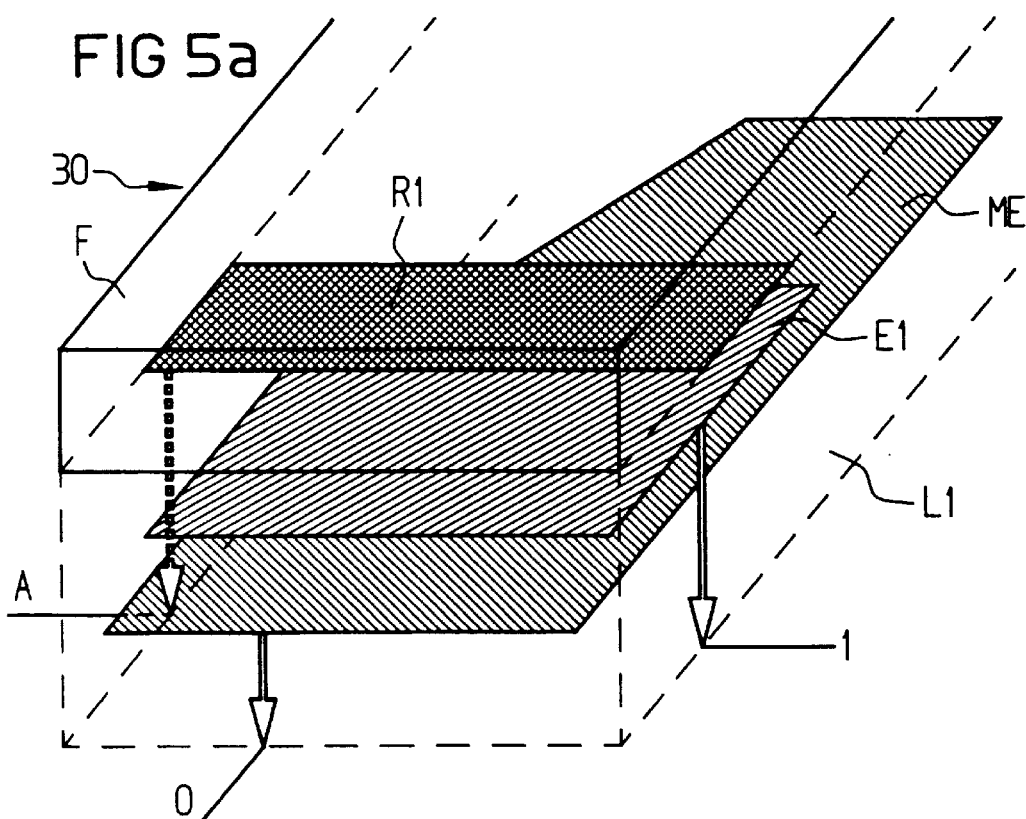
FIG. 5a schematically shows an enlarged perspective view of a part of a passive network of the present invention as a CCRL array.

The perspective and enlarged schematic view of a part of a passive network in the form of a CCLR array in FIG. 5a is a development of the CCR array shown in FIG. 3a, wherein a ferrite wafer F is applied on the surface of the resistance layer R1. The design under the ferrite wafer F is identical with the design, described on the basis of FIG. 3a, of the CCR array chip 20.

Figure 5B:
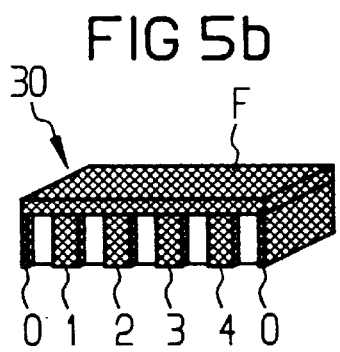
FIG. 5b schematically shows an enlarged perspective view of a CCRL array in the form of a chip.
Figure 5C:
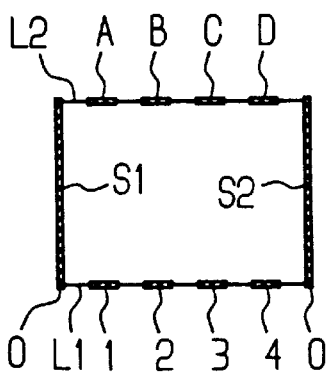
FIG. 5c shows a sectional view of the CCRL array of FIG. 5b.

The representation in FIG. 5b differs from the representation in FIG. 3b only in the ferrite wafer F applied on the resistance regions R1 to R4 in FIG. 3b. Since the ferrite wafer F in the sectional view of FIG. 5c cannot be shown, the sectional view of FIG. 5c corresponds to that of FIG. 3c.

Figure 5D:
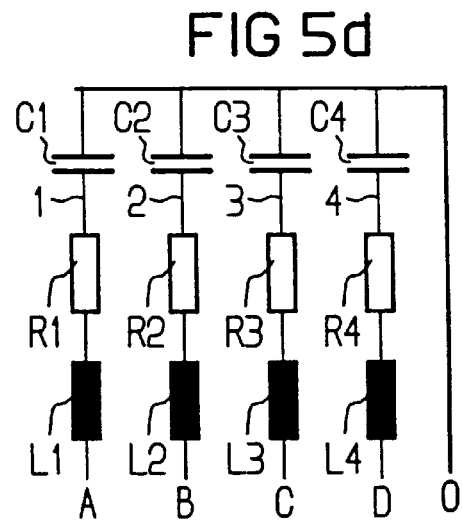
FIG. 5d shows an equivalent circuit diagram of a CCRL array of FIGS. 5b and 5c.
Figure 5E:
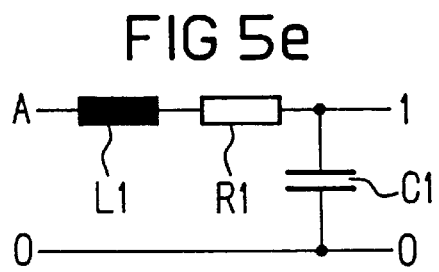
FIG. 5e shows an equivalent circuit diagram of an RCL element.

The equivalent circuit diagram of the CCRL array in FIG. 5d is shown as a comparison with the equivalent circuit diagram of the CCR array in FIG. 3d, expanded by four inductances L1 to L4 connected in series with the resistors R1 to R4. FIG. 5e merely shows an equivalent circuit diagram of an RCL element formed from the inductance L1, the resistor R1 and the capacitor C1.

Although the present invention has been described with reference to specific embodiments, those of skill in the art will recognize that changes may be made thereto without departing from the spirit and scope of the invention as set forth in the hereafter appended claims.

What is claimed is:

1. A passive network in the form of a chip, comprising:
   a chip wafer wherein internal conductors of a plurality of capacitors are led out at a first longitudinal side surface of the first chip wafer as first terminals, and wherein common frame electrodes of the plurality of capacitors are led out at both frontal side surfaces of the chip wafer;
   a plurality of resistance layer regions that are applied alongside one another on a surface of the chip wafer which correspond to the plurality of capacitors, each of the plurality of resistance layer regions having a respective second terminal connected to an internal conductor of a respective capacitor, and each of the plurality of resistance layer regions having a respective first terminal that is lead out at a second longitudinal side surface of the second chip wafer; and
   a ferrite wafer applied on a surface of the plurality of resistance layer regions, thereby producing a CCRL array.

2. A passive network in the form of a chip as claimed in claim 1, wherein a number of passive elements of the chip is a multiple of 2.

3. A passive network in the form of a chip as claimed in claim 1, wherein a number of passive elements of the chip is a multiple of 5.

4. A circuit board comprising:
   the passive network chip according to claim 1,
   interconnects connected with terminals on the longitudinal sides of the passive network chip; and
   a microcontroller connected to the passive network chip with the interconnects via interconnect terminals.

5. The circuit board according to claim 4, wherein the interconnects are not led through under the passive network chip when connected to the passive network chip.

* * * * *